United States Patent [19]
Stocker et al.

[11] Patent Number: 5,583,297
[45] Date of Patent: Dec. 10, 1996

[54] PROCESS FOR EVALUATING THE OUTPUT SIGNALS OF TWO PRESSURE SENSORS AND A PRESSURE MEASURING ARRANGEMENT WITH TWO PRESSURE MEASURING SENSORS AND A PRESSURE MEASURING HEAD

[75] Inventors: Rudolf Stocker, Azmoos; Armin L. Stoeckli, Sargans; Martin Boesch, Azmoos, all of Switzerland

[73] Assignee: Balzers Aktiengegesellschaft, Fuerstentum, Liechtenstein

[21] Appl. No.: 361,303

[22] Filed: Dec. 15, 1994

[30] Foreign Application Priority Data

Dec. 15, 1993 [CH] Switzerland .................. 3 757/93

[51] Int. Cl.$^6$ ..................................................... G01L 21/12
[52] U.S. Cl. ................................................. 73/755; 73/700
[58] Field of Search ....................... 73/755, 700; 364/558, 364/571.02

[56] References Cited

U.S. PATENT DOCUMENTS

| | | |
|---|---|---|
| 3,064,478 | 11/1962 | Schafer . |
| 4,747,311 | 5/1988 | Hojoh . |
| 4,755,669 | 7/1988 | Grant et al. . |
| 4,995,264 | 2/1991 | Stocker et al. . |
| 5,024,100 | 6/1991 | Weinstein .............................. 73/726 X |
| 5,252,864 | 10/1993 | Kooijman ................................. 327/350 |

FOREIGN PATENT DOCUMENTS

| | | |
|---|---|---|
| 0347144 | 12/1989 | European Pat. Off. . |
| 0379841 | 8/1990 | European Pat. Off. . |
| 0223784 | 4/1992 | European Pat. Off. . |

OTHER PUBLICATIONS

*Feingeraetetechnik 24*, entitled "Zur Kombination meherer-Druckmessverfahren in einer Messzelle" by C. Edelmann et al., pp. 408–411, 1975.

Primary Examiner—Richard Chilcot
Assistant Examiner—Joseph L. Felber
Attorney, Agent, or Firm—Evenson, McKeown, Edwards & Lenahan, P.L.L.C.

[57] ABSTRACT

Particularly for the combination of cold-cathode ionization sensors and Pirani sensors, for obtaining a one-to-one measuring range which is significantly expanded compared to the measuring ranges of the respective sensor types, a weighting technique is provided in a transition range ΔP of the respective sensor measuring ranges by which the characteristic sensor curves can constantly be guided into one another in a one-to-one manner.

22 Claims, 7 Drawing Sheets

PROCESS FOR EVALUATING THE OUTPUT SIGNALS OF TWO PRESSURE SENSORS AND A PRESSURE MEASURING ARRANGEMENT WITH TWO PRESSURE MEASURING SENSORS AND A PRESSURE MEASURING HEAD

BACKGROUND AND SUMMARY OF THE INVENTION

The present invention relates to a process for evaluating the output signals of two pressure sensors of which a first sensor is designed for an upper pressure range, and a second sensor is designed for a lower pressure range. The two pressure ranges overlap in an intermediate range. While the pressures in the intermediate range are the same, the two sensors have different values of the output signal characteristics. The present invention further relates to a pressure measuring arrangement for carrying out the process as well as a pressure measuring head.

Various measuring principles are known for measuring pressures in the range from 1 bar absolute into the ultrahigh vacuum range. However, each vacuum measuring principle known today has disadvantages, the following being the most important disadvantages: limited measuring range; dependence on gas type; susceptibility to disturbing influences, such as temperature, contamination and aging; and cost factor.

A starting point for solving these problems, particularly also with respect to the limited measuring range, is the use and combination of several pressure sensors having different measuring principles which are acted upon by the same pressure medium. For this purpose, the following solutions are known.

In a first solution, the measuring signals of at least two separately constructed sensors which operate according to different measuring principles are processed on the same evaluating apparatus. Using the signal of one sensor, that is, when a limit pressure value of the pressure range assigned to this sensor is reached, the second sensor is locked-on. Depending on the pressure range, the signal of one or the other sensor is displayed on the evaluating measuring apparatus. Examples of this technology are the Pirani sensor/ cold-cathode or hot-cathode ionization sensor combination of Balzer's PKG 100, TPG 300, IMG 300 model apparatuses, as well as, for example, the COMBIVAC, COMBITRON model apparatuses manufactured by Leybold Co.

An advantage of this first approach is the large measuring range. However, the high costs are disadvantageous, particularly as the result of providing two separate sensor arrangements and their mounting measures, for example, the use of two connecting flanges. Further, the output signal is neither constant nor single-valued over the pressure range due to switch over from one sensor to the other. Since the dependence on the gas type and other disturbing influences may be very different in the known different measuring principles, the change-over jumps may be very large. A stable pressure control, for example, is not possible in this change-over range.

In a second solution for reducing the cost and the space requirement, it is also known to combine different measuring sensors on a flange. The different sensors operate according to different measuring principles. However, then the evaluation of the sensor signals takes place as described above for the first solution. In this respect, reference can be made to the combination of a piezoresistive diaphragm-type sensor and a Pirani sensor on a flange, for example, in the case of the VSKP45M Model Apparatus manufactured by Thyracont Electronic GmbH, Passau, Germany. Also known is the combination of a hot-cathode ionization pressure gauge and a Pirani sensor on a flange, with respect to which reference is made to C. Edelmann, et al., *Feingerätetechnik* 24, Pages 408 to 411 (1975), as well as European Patent document EP-A-0 233 784 and U.S. Pat. No. 4,755,669, as well as to the Model AIG17P measuring tube manufactured by AML Co.

Under this aspect, the combination of a gas friction pressure gauge and a hot-cathode ionization pressure gauge on a flange is also known, with respect to which reference is made to U.S. Pat. No. 4,747,311. As mentioned above, in all these known cases, the sensor signals are changed-over when the range limits are reached, and their output signals are displayed only as an alternative. Nevertheless, costs are saved in comparison to the solution first described above.

A third known solution uses a combination of a gas friction pressure gauge and a Pirani sensor on a flange. In this combination, the two sensor output signals are processed such that an output signal is generated which is constant in an expanded pressure range without any changeover jumps. Reference is made in this respect to European Patent document EP-A-0 347 144.

Also known is a combination of a gas friction pressure gauge and a Pirani sensor on a flange and the combination of the two sensor signals in such a manner that an output signal is generated which is virtually independent of the gas type, with respect to which reference is made to European Patent document EP-A-0 379 841 corresponding to U.S. Pat. No. 4,995,264.

Furthermore, the combination of the signals of a diaphragm-type pressure sensor and a heat conduction sensor corresponding to a Pirani sensor is also known in order to develop altimeters which are sensitive in a large range. Such a combination is described in U.S. Pat. No. 3,064,478.

The present invention is based on the above-mentioned prior art known from European Patent document EP-A-0 347 144. According to this reference, a quartz oscillator is subjected to a vacuum and, similar to a Pirani sensor, the heat conduction into the environment from a heating spiral is detected by the heating effect on the quartz oscillator. In this case, the heating current of the spiral is controlled such that, when the pressure varies, the resonance frequency of the quartz oscillator remains constant. The electric heating energy supplied to the heating spiral as a control element is measured as one sensor output signal. The resonance voltage of the quartz oscillator is measured as the second sensor output signal. By recognizing that the pressure dependence of the power, fed for a constant resonance frequency of the heating spiral, decreases in a lower pressure range in order to move toward a constant minimal value, and that the resonance voltage does not decrease before an upper pressure range is reached, then by means of the summation of the two quantities to be considered, the sensor output signals, specifically the heating energy and the resonance voltage, determine a characteristic pressure discriminator curve which permits a pressure discrimination for seven pressure decades.

Although a large measuring range can be measured using the known art discussed in European Patent document EP-A-0 347 144, the suggested signal superposition technology is very specifically based on the thermal resonance behavior of a quartz oscillator.

There is therefore needed a process of the above-mentioned type in which, depending on the pressure range to be covered by the measuring technique, known pressure measuring sensors with their specific measuring ranges can be combined without generating measuring signal jumps or hysteresis effects at the transition range, that is, in the intermediate range. This has the purpose of permitting, depending on the usage, the selection of suitable sensor combinations which permit, in particular, increasing the pressure range measured one-to-one by the measuring technique using the targeted sensor selection, very significantly above that known from European Patent document EP-A-0 347 144. Further, the combination also particularly permits a massive enlarging of the one-to-one measuring range in comparison to an individual sensor.

These needs are met according to the present invention by a process for evaluating the output signals of two pressure sensors, of which a first sensor is designed for an upper pressure range, and a second sensor is designed for a lower pressure range. The two pressure ranges overlap in an intermediate range. While the pressures in the intermediate range are the same, the two sensors have different values on the output signal characteristics. When output signal characteristics exist in the intermediate range which are predominantly displaced in parallel, i.e., different merely by an offset value, a common output signal A is generated in the form:

$$A = f p_p + (1-f) p_k,$$

wherein:

$p_p$ is the output signal of the first sensor;

$p_k$ is the output signal of the second sensor; and f is a weighting function which changes constantly monotonically with the pressure p. In the case that the signal characteristics predominantly differ with respect to their slopes, an output signal A is generated in the form:

$$A = p_p^{f} * p_k^{(1-f)},$$

wherein the weighting function f in the range at and below the upper limit pressure of the pressure range of the second sensor is selected to be essentially at 0, and in the range at and above the lower limit pressure of the pressure range of the first sensor, is selected to be essentially at 1.

A particularly preferred sensor combination according to the invention is that of a Pirani sensor and of a cold-cathode ionization sensor. Apart from the transition control from one sensor to the next first discussed here, the preferred above-mentioned combination, in comparison to the use of Pirani sensors with hot-cathode ionization sensors, has the significant advantage that the cold-cathode ionization sensor develops much lower heat than that of a hot-cathode ionization sensor. Thermal disturbances from one sensor to the next and disturbances as a result of waste gases are therefore considerably reduced. Thus, constructionally, the combination of a Pirani sensor and a cold-cathode ionization sensor can be much closer together than the constructional combination of a Pirani sensor and a hot-cathode ionization sensor.

Further, when considering the relevant measuring range of a Pirani sensor of below $10^{-3}$ mbar to above 100 mbar, as well as the relevant measuring range of a cold-cathode ionization sensor, as known, for example, from Max Wutz "Theorie und Praxis der vakuumtechnik" ("Theory and Practice of Vacuum Technology"), Friedr. Vieweg & Sohn, Braunschweig/Wiesbaden, which ranges from at least $10^{-8}$ mbar to $10^{-2}$ mbar, it is found that, by means of the combination according to the invention, a pressure range can be covered which is much higher than seven decades and which passes through nine or more pressure decades, that is, for example, from $10^{-8}$ to above 100 mbar. Because of the suggested weighted combination of the sensor output signals, a one-to-one measuring takes place over the entire pressure range.

In the case of this preferred sensor combination, the weighting function is controlled by the output signal of the Pirani sensor which still provides relevant measurements in the entire pressure range, and particularly also in the intermediate pressure range above $10^{-4}$ mbar to $10^{-2}$ mbar, or, in the case of a preferred and optimum embodiment, to implement the above-mentioned weighting function by a combination of the Pirani output signal and a signal fed back from the weighted combined output signal.

In the case of a further advantageous embodiment, the implementation of the weighted signal superposition becomes easily possible particularly by using the analog switching technique on bipolar transistors.

Basically, the weighted signal superposition, as mentioned above, may take place by analog technology or, as will be explained in the following, by means of a pulse width modulation or, optionally, also by means of a computerized processing of digitized sensor output signals.

The multiplicative weighting, which is also used in the case of the Pirani sensor/cold-cathode ionization sensor combination preferred according to the invention, is preferably carried out by optimally controlling the weighting function by the combination of the Pirani output signal and a feedback signal which is derived from the weightedly combined output signal.

A pressure measuring sensor according to the invention, for satisfying the above-mentioned needs, includes two pressure measuring sensors of which a first sensor is designed for an upper pressure range, and a second sensor is designed for a lower pressure range. The pressure ranges overlap in an intermediate range. While the pressures are the same in the intermediate range, the sensors have different values of the output signal characteristics. The outputs of the sensors are guided to a weighting and evaluating unit whose output signal A follows at least in a first approximation:

$$A = f p_p + (1-f) p_k;$$

or $$A = p_p^{f} * p_k^{(1-f)};$$

wherein

A is an output signal of the weighting and evaluating unit;

$p_p$ is an output signal of the first sensor;

$p_k$ is an output signal of the second sensor; and f is a weighting function which extends constantly monotonically in the intermediate range between 0 and 1.

A pressure measuring head according to the present invention has a pressure measuring arrangement basically comprising the above-mentioned preferred combination of a Pirani sensor and a cold-cathode ionization sensor which are constructionally combined on the head.

Other objects, advantages and novel features of the present invention will become apparent from the following detailed description of the invention when considered in conjunction with the accompanying drawings.

DETAILED DESCRIPTION OF THE DRAWINGS

Figure 1:
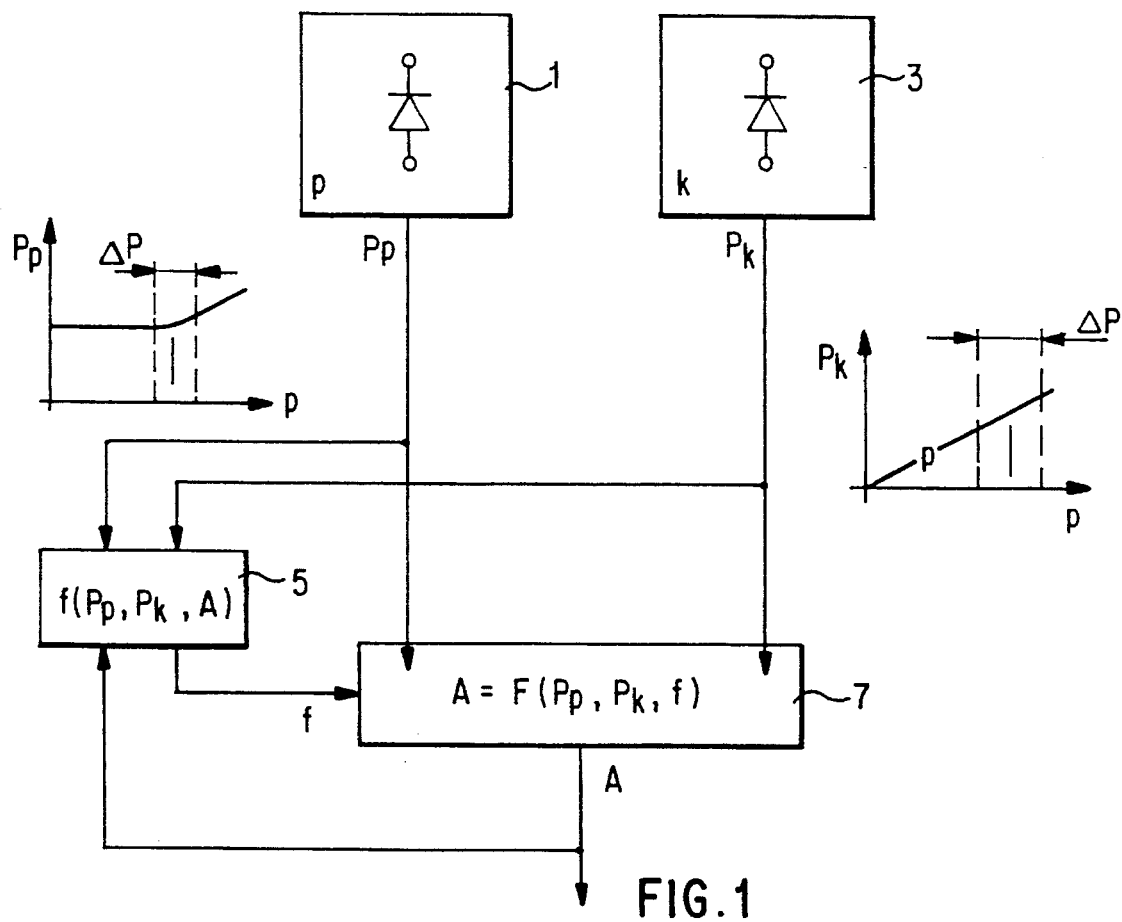
FIG. 1 is a functional block/signal diagram of a pressure measuring arrangement according to the invention, operating according to the process according to the invention.

Referring to FIG. 1, the basic principle of the signal processing technique according to the present invention will be explained first.

Two sensors 1 and 3 are of the "p" and "k" type. As a function of the same quantity p to be physically detected, the sensors 1 and 3 emit output signals $p_p$ and $p_k$. In this case, sensor 1, for example, in an upper value range of the physical quantity p, emits a representative signal; sensor 3 emits a representative signal in the lower value range of the physical quantity p.

The output signals of sensors 1 and 3 are, on the one hand, supplied to a weighting function unit 5 and, on the other hand, to a measured-value determination unit 7. The measured-value determination unit 7 emits an output signal A as a signal representative of the physical quantity p. An intermediate range ΔP is determined within which the transition from sensor 1 to sensor 2 takes place with respect to a representative measurement.

In the most general case, the output signal A of the measured-value determination unit 7 is also supplied to the weighting function unit 5. The weighting function f is formed in the weighting function unit 5 as a function of the sensor output signals as well as of the output signal of the measured-value determination unit 7. In the measured-value determination unit 7, the output signal A is formed as a function of the sensor output signals as well as of the weighting function f.

In the following, the type of weighting will be described.

Figure 2:
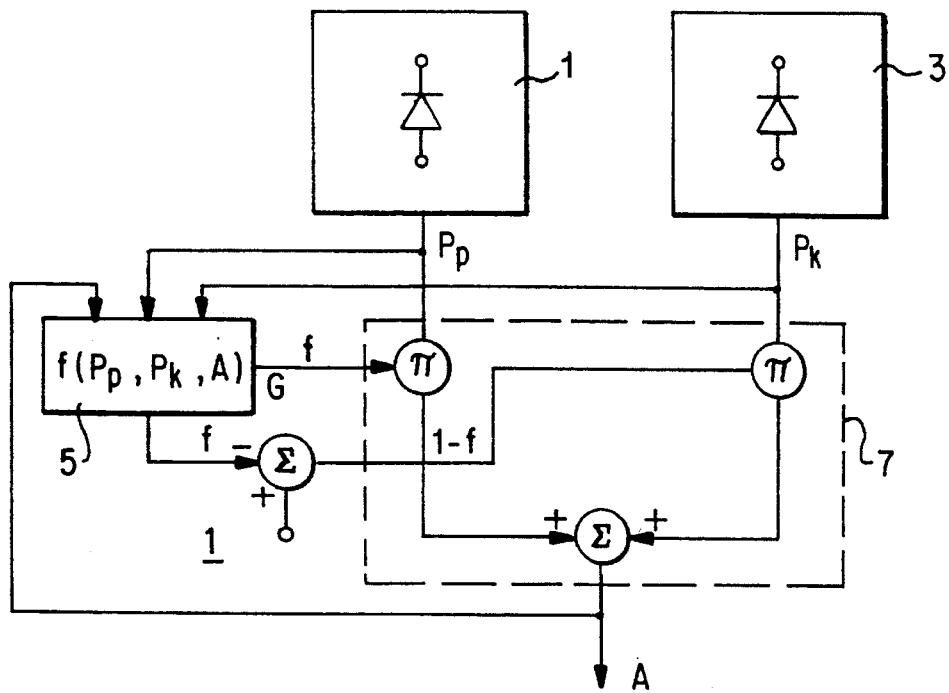
FIG. 2 is a block diagram view of a specific embodiment of the approach according to FIG. 1, preferably for sensors, whose output characteristics are additively different in an intermediate range (different offset)

In the case of an additive combination of the sensor output signals, the output signal A according to FIG. 2 of the measured-value determination unit 7 is formed according to:

$$A = fp_p + (1-f)p_k \qquad \text{Eqn. (1)}$$

("arithmetical weighting"). In equation (1), f is the weighting function and extends in the intermediate range ΔP between the values 0 and 1, for example, such that, according to Eqn. (1) and FIG. 1, on the left edge of ΔP, the weighting function assumes the value 0, and on the right edge, it assumes the value 1.

Figure 3:
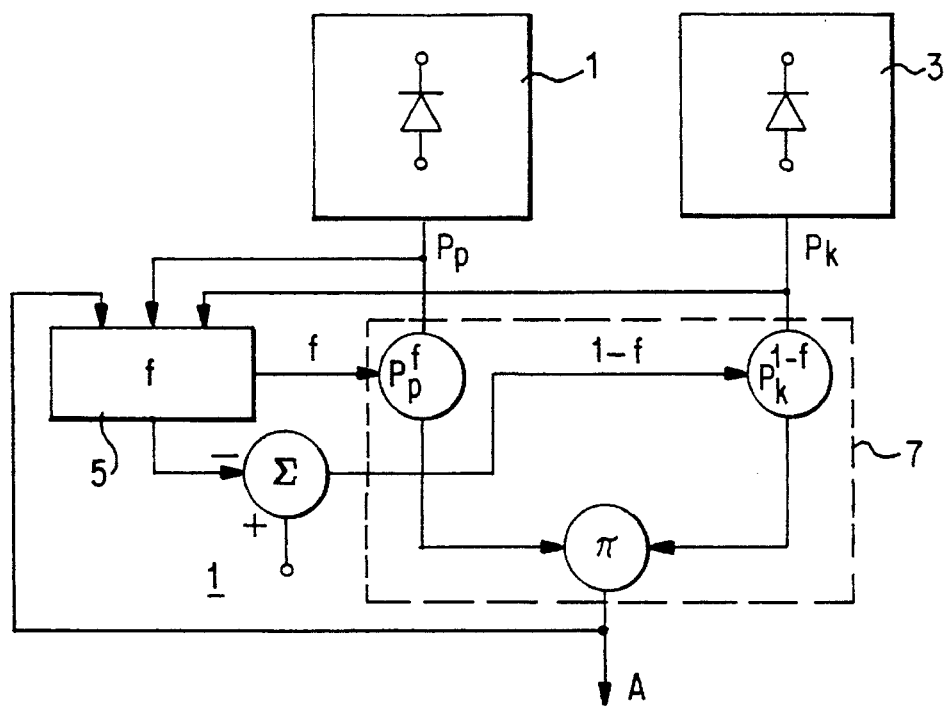
FIG. 3 is a block diagram view of another specific embodiment of the process, preferably for sensors, whose output characteristics are multiplicatively different in the intermediate range (different sensitivity)

The second type of signal combination is the multiplicative type ("geometrical weighting"). Accordingly, the output signal A is formed according to:

$$A = p_p^f * p_k^{(1-f)} \qquad \text{Eqn. (2)}$$

corresponding to FIG. 3.

As in FIG. 2, the measured-value determination unit 7 is also shown in FIG. 3 by an interrupted line.

Which of the two above-mentioned basic weighting measures is better depends on the defect influences which must be taken into account during the transition from measuring the physical quantity p by one sensor to their measurement by the second sensor.

As initially mentioned, the problem which is to be primarily solved according to the present invention is approached particularly on the basis of the task of being able to carry out a one-to-one pressure measuring over many decades. A one-to-one pressure measuring is to be carried out in such a large range that it cannot be implemented by an individual sensor. For this purpose, different pressure sensors must be used which measure representatively in different pressure ranges. According to the present invention, a Pirani pressure sensor 1 and a cold-cathode ionization measuring sensor 3 were used. For this reason, the symbol p was used in FIGS. 1 and 2, on the one hand, for the physical quantity and, for the sensor output signals, the indexing p (Pirani) and k (cold cathode) were selected.

In the case of pressure measuring using the two above-mentioned pressure sensors according to the invention, additive deflections, that is, residual deflections, do not have priority, but rather multiplicative effects, that is, deflections with respect to the steepness of the characteristic curves.

In a preferred manner, the second weighting type is therefore used for the pressure measuring problem on which the present invention is primarily based. Specifically, the multiplicative combination of the pressure sensor output signals is used as shown in FIG. 3 and Equation (2).

This pressure measuring problem will now also be explained further.

From U.S. ppplication Ser. No. 08/093,734, filed on Jul. 20, 1993, the specification of which is herein incorporated by reference, now U.S. Pat. No. 5,475,623, it is known how an output signal which is proportional to the logarithm of the pressure is implemented by a Pirani pressure sensor, basically, by the utilization of the logarithmic dependence of the base emitter voltage of a bipolar transistor on the collector current. When the electric output signal of the sensor controls the base emitter paths of bipolar transistors, an output signal which is proportional to the collector current becomes proportional to the logarithm of the detected pressure value.

The output signal of the cold-cathode ionization sensor can be used analogously.

The following abbreviations will now be used:
$U_A = \log A$, $$U_p = \log p_p, \quad \text{Eqn. (3)}$$

$U_k = \log p_k$, with U, for example, in V; p, for example, in mbar.

From Eqn. (2), the combination function or the output signal $U_A$ is therefore obtained at:

$$U_A = fU_p + (1-f)U_k \quad \text{Eqn. (4)}$$

Figure 4:
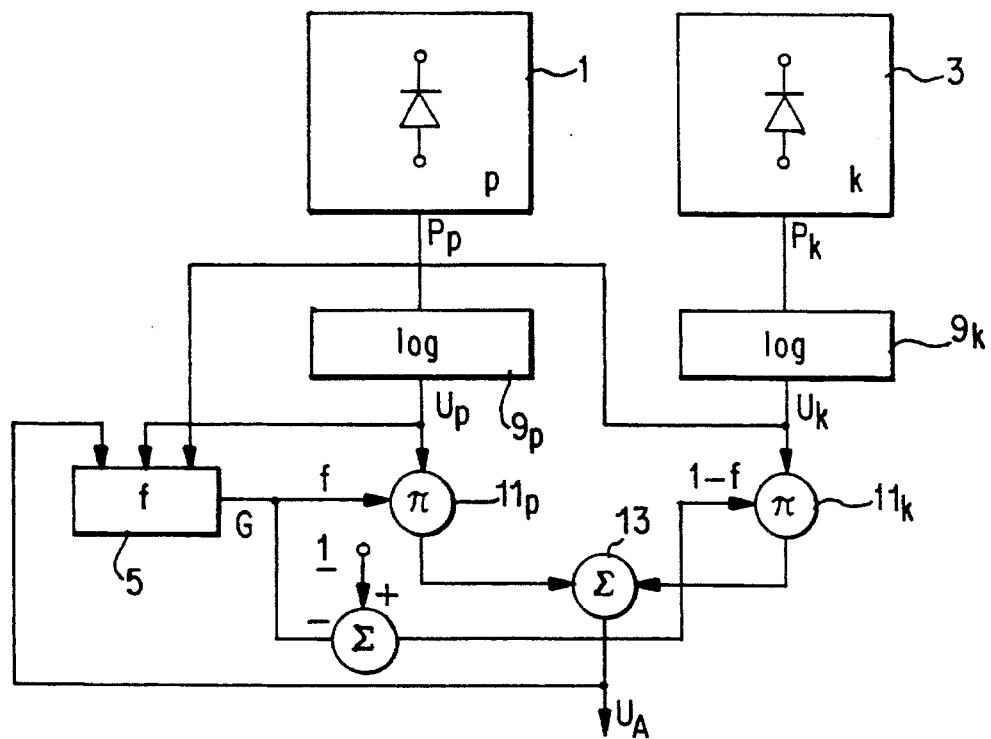
FIG. 4 is a block diagram view of another preferred embodiment of the process according to FIG. 3.

Therefore, according to FIG. 4, the output signal of the Pirani sensor 1 is guided via a logarithmizing unit $9_p$, while the output signal of the cold-cathode ionization sensor 3, $p_k$, is guided via a logarithmizing unit $9_k$. Both units are constructed, for example, on the principle of the utilization of the above-mentioned base emitter/collector current dependence.

In multiplication units $11_p$ and $11_k$, the signals $U_p$ or $U_k$ are weighted corresponding to the weighting functions "f" from the output of the weighting function unit 5, or "1–f", and are summed at the summation unit 13 for forming the term of Eqn. (4), for example, in the manner of analog programming.

In the following, the formation of the weighting function f and therefore of the complementary weighting function 1–f will be discussed.

So far, a system representation was selected in individual separate function blocks in order to explain the weighting technique according to the invention.

It is understood that, in addition to a thus controlled implementation technique in the manner of analog programming, the represented principle can also be implemented by analog circuit technology or by digital processing technology or by other technologies. In the following, implementation forms in analog technology, and according to the pulse width modulation process, are primarily discussed as currently preferred implementation techniques.

It is known that the upper measuring range limit of the cold-cathode ionization sensor 3 is to be set at $10^{-2}$ mbar, and the lower measuring range limit of the Pirani sensor is to be set at $10^{-4}$ mbar. Thus, above $10^{-2}$ mbar, virtually only the Pirani sensor must determine the measuring output signal, while below $10^{-4}$ mbar, virtually only the cold-cathode ionization sensor 3 must determine the measuring result. In-between, that is, between $10^{-4}$ mbar and $10^{-2}$ mbar, a constant monotonic transition of the measuring signal relevance must take place from the cold-cathode ionization sensor 3 to the Pirani sensor 1.

Therefore, the following is to apply to the ideal case:

$$f = 1 \text{ for } p > 1 \cdot 10^{-2} \text{ mbar} \quad \text{Eqn. (5a)}$$

$$f = 0 \text{ for } p < 1 \cdot 10^{-4} \text{ mbar} \quad \text{Eqn. (5b)}$$

The specific form of the function f and the quantity or quantities on which the function f is to depend must be determined based on the following information.

(a) The controlling of the weighting function f on unit 5 by the actual pressure p or the physical quantity to be measured is not possible in most cases because the respective information is not available.

(b) The controlling of the weighting function f by the output signal of the Pirani sensor 1 presents itself because the Pirani sensor 1 can remain operative over the entire pressure range and an output signal is therefore present over the entire pressure range. However, in the case of pressures in the range of $10^{-4}$ mbar, the measuring precision is reduced. This has the effect that the control of the weighting function f on the weighting unit 5 by the output signal of the Pirani sensor is not optimal.

(c) The controlling of the weighting function f by the output signal of the cold-cathode ionization sensor 3 is not a suitable solution because the latter sensor may be switched on only when the pressure measured by the Pirani sensor 1 is below $10^{-2}$ mbar.

(d) The controlling of the weighting function f by the output signal value corresponding to A which has already been combined in a weighted manner would be good per se because, as the result of the combination of the two sensor output signals, this value is already a good approximation to the actual pressure. However, the feedback of the weighted output signal to its own weighting adaptation, in certain cases, may lead to stability problems or oscillating quantities.

In addition to the control of function f solely by a quantity $(p_p, p_k, p, A)$ combinations of these quantities as well as additional quantities may be used for this purpose.

(e) The optimal solution in every respect, that is, as far as the precision and feasibility are concerned, is the control of the weighting by a combination of the Pirani sensor output signal $p_p$ and the weightedly combined value A. This combination is:

$$f = f(p_p^a * A^b) \quad \text{Eqn. (6)}$$

When logarithm-proportional output signals $U_p$ and $U_A$ according to Eqn. (3) are present, this weighting function will be simplified as follows:

$$f = f(aU_p + bU_A) \quad \text{Eqn. (6a)}$$

wherein a and b are still freely selectable constants.

This weighting function must meet the requirements according to Eqns. (5a) and (5b) and, in the intermediate range, must rise monotonically and constantly with the pressure.

Figure 5:
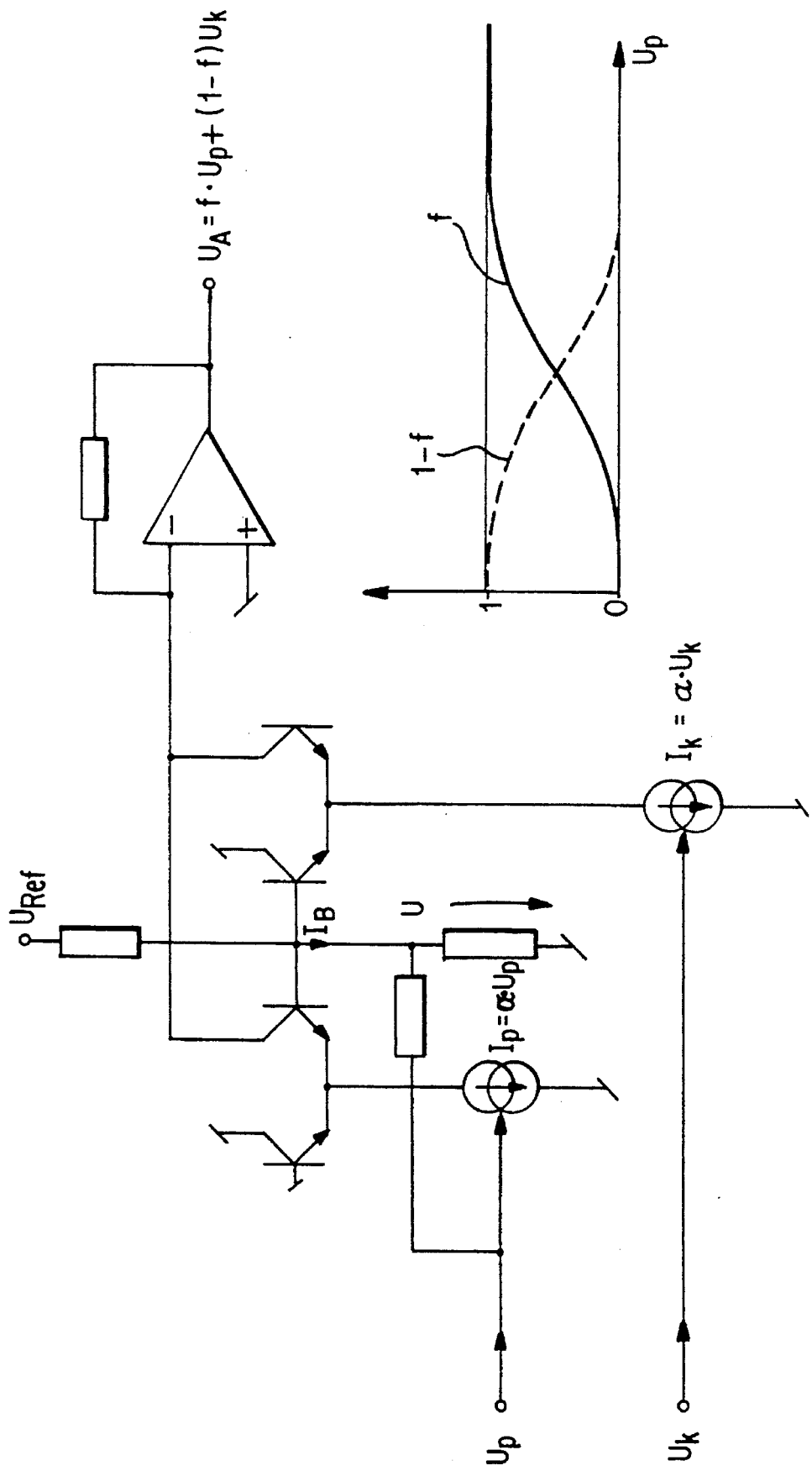
FIG. 5 is a schematic block diagram view of the circuit technology of an embodiment of a weighting and evaluating unit, particularly for the output signals of the Pirani sensor and the cold-cathode ionization sensor.

FIG. 5 illustrates a possible preferred embodiment according to option (b) above of the weighting unit combined with the measured-value determination unit 7 in analog technology. Again, while utilizing the logarithmic dependence between the base emitter voltage of bipolar transistors and their collector current, the following applies to the weighting function:

$$f = 1/[\exp(-\lambda U) + 1] \quad \text{Eqn. (7a)}$$

$$1 - f = 1/[\exp(\lambda U) + 1] \quad \text{Eqn. (7b)}$$

wherein $\lambda = e/kT$,
e = elementary charge
k = Boltzmann constant
T = absolute temperature.

As easily recognizable in FIG. 5, the following equation is obtained for the signal U:

$$U = c + d\, U_p \quad \text{Eqn. (7c)}$$

wherein c and d are constants.

As in the case of the calculation of $U_A$, particularly because of the above-mentioned logarithmic dependencies between base emitter voltages and collector currents of the bipolar transistors, with a subsequent limiting value formation for $U_p \to 0$ and $U_p \to \infty$, the course for functions f and (1−f) illustrated in FIG. 5 is obtained. In this case, the weighting function f is characterized by a very soft transition. However, it will reach the value 1 precisely only at infinitely high pressures; the value 0 at any pressure value scaled to 1, whereby the above-mentioned Equations (5a, 5b) are met only approximately.

Figure 6:
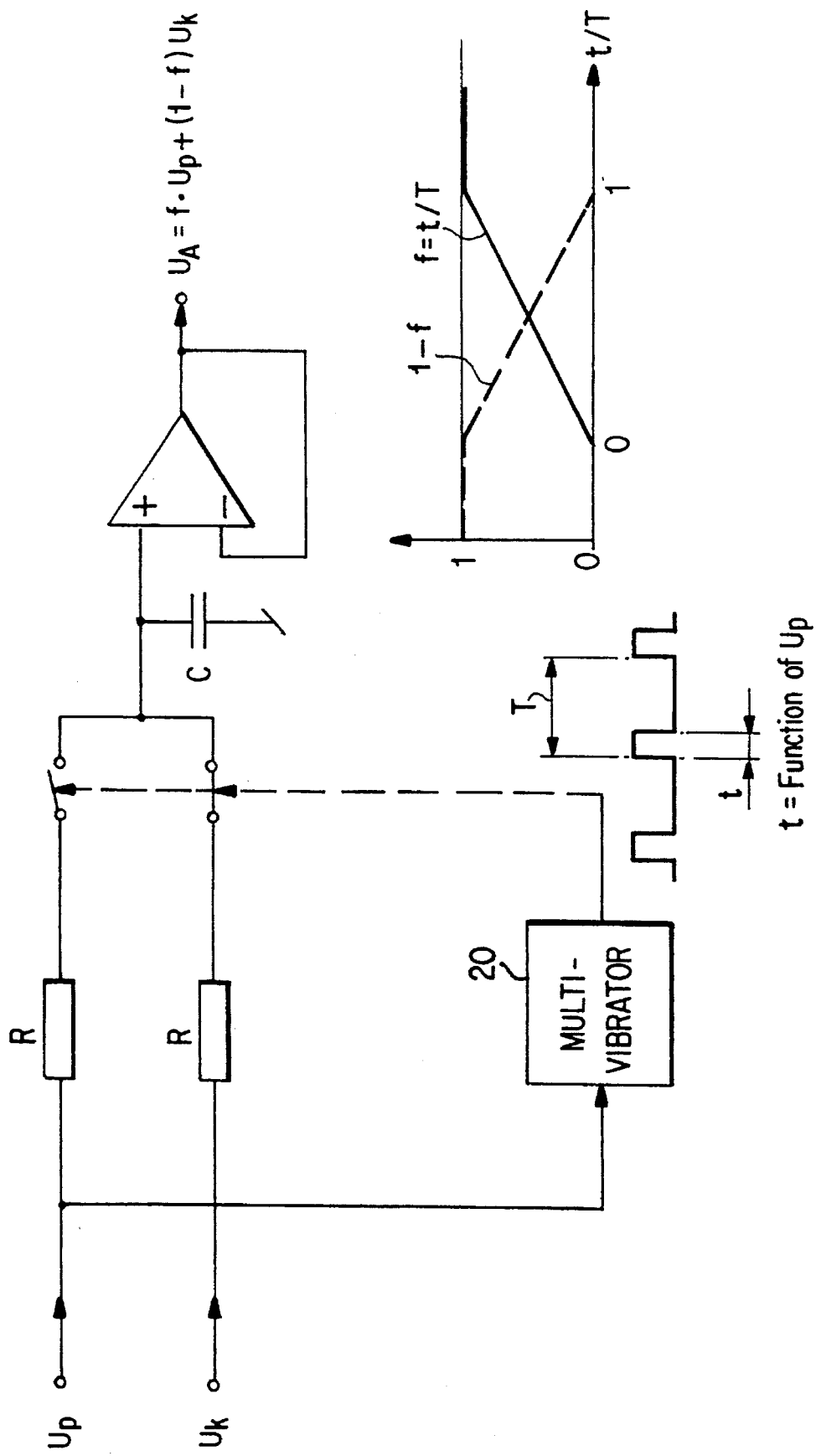
FIG. 6 is a schematic block diagram view of another embodiment for the implementation of the weighting function used according to the invention by means of pulse width modulation technology.

FIG. 6 is a schematic representation of a circuit arrangement by which, according to principle (b) above, the weighting function is implemented by pulse width modulation.

If it is true that for a capacitance value C and a resistance value R, RC>>T, with T being the pulse repetition period of the astable multivibrator 20, then:

$$f = t/T \qquad \text{Eqn. (8)}$$

In this case, the pulse width t or, more generally, the pulse-width repetition rate, is controlled by the output signal of the Pirani sensor or by the signal $U_p$ (Eqn. 3). As a result, for example, the linear weighting function f or 1−f illustrated in FIG. 6 can be implemented. This takes place if:

$$t = c' + d' U_p \qquad \text{Eqn. (8a)}$$

is selected, wherein c' and d' are constants.

Naturally, other controls t=t(p) which are adapted to the problem are also possible (compare, for example, U. Tietze, Ch. Schenk, "Halbleiter-Schaltungstechnik" ("Semiconductor Circuit Technology"), Springer Publishers (1988), Chapters 11.7 and 11.8).

Figure 7:
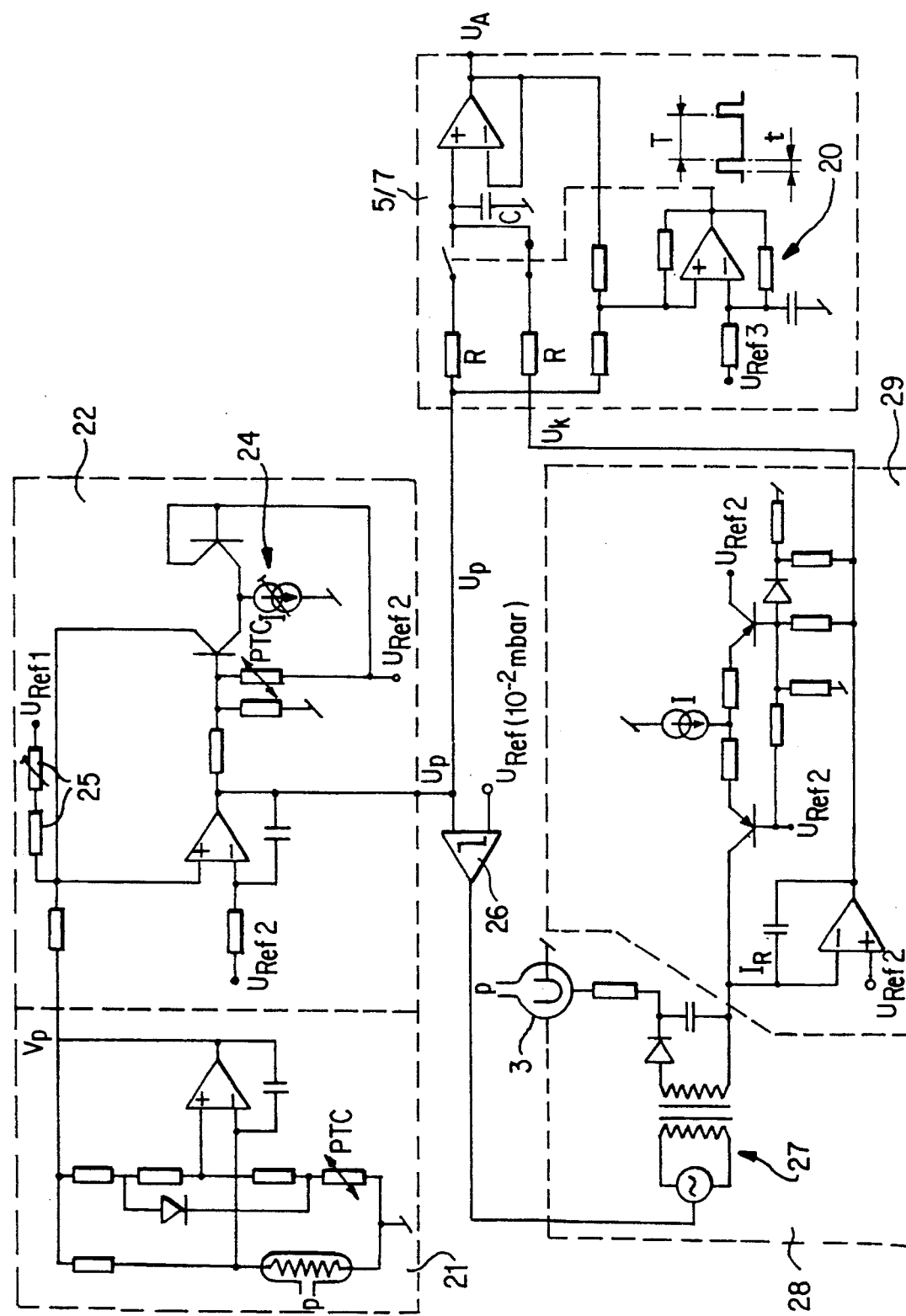
FIG. 7 is a schematic block diagram view of a currently preferred embodiment of a pressure measuring arrangement according to the invention, operating according to the process of the invention in which the weighting function is controlled by the output signal of a Pirani sensor as well as by the feedback from the weightedly combined measuring output signal.

FIG. 7 illustrates a currently preferred circuit configuration according to principle (e) described above. The output signal $p_p$ of the Pirani measuring bridge circuit 21 with the Pirani sensor 1 is logarithmized on a logarithmizing circuit 22, which results in $U_p$. In this case, the equalization of $U_p$ for $p \to \approx$ takes place on an adjustable current source 24, and the equalization for $p \to 0$ takes place on a potentiometer circuit 25.

By way of a threshold-value-sensitive unit 26, to which the reference $U_{ref}$ corresponding to $10^{-2}$ mbar is fed, starting with pressure values below that, the high-voltage system part 27 of the cold-cathode ionization measuring arrangement 28 is set into operation by the cold-cathode ionization sensor 3. The output signal $I_k$ is logarithmized on a "logarithmizing circuit" 29. The output signal $U_k$ and the output signal $U_p$ of the logarithmizing circuit 22 are fed to the weighting and measured-value determination circuit 5, 7, which operates according to the principle explained by FIG. 6 in which, however, according to principle (f), the output signal $U_A$ controls the pulse-width repetition rate t/T together with $U_p$.

The sensors with their measuring circuits generate measuring-principle-specific characteristic output curves $V_p$, $I_k$. How these characteristic curves are converted to signals $U_p$, $I_k$, which logarithmically depend on the pressure, is explicitly described in U.S. application Ser. No. 08/093,734, now U.S. Pat. No. 5,475,623, incorporated by reference above for the Pirani principle. The analogous approach is used for the cold-cathode principle according to FIG. 7.

Figure 8:
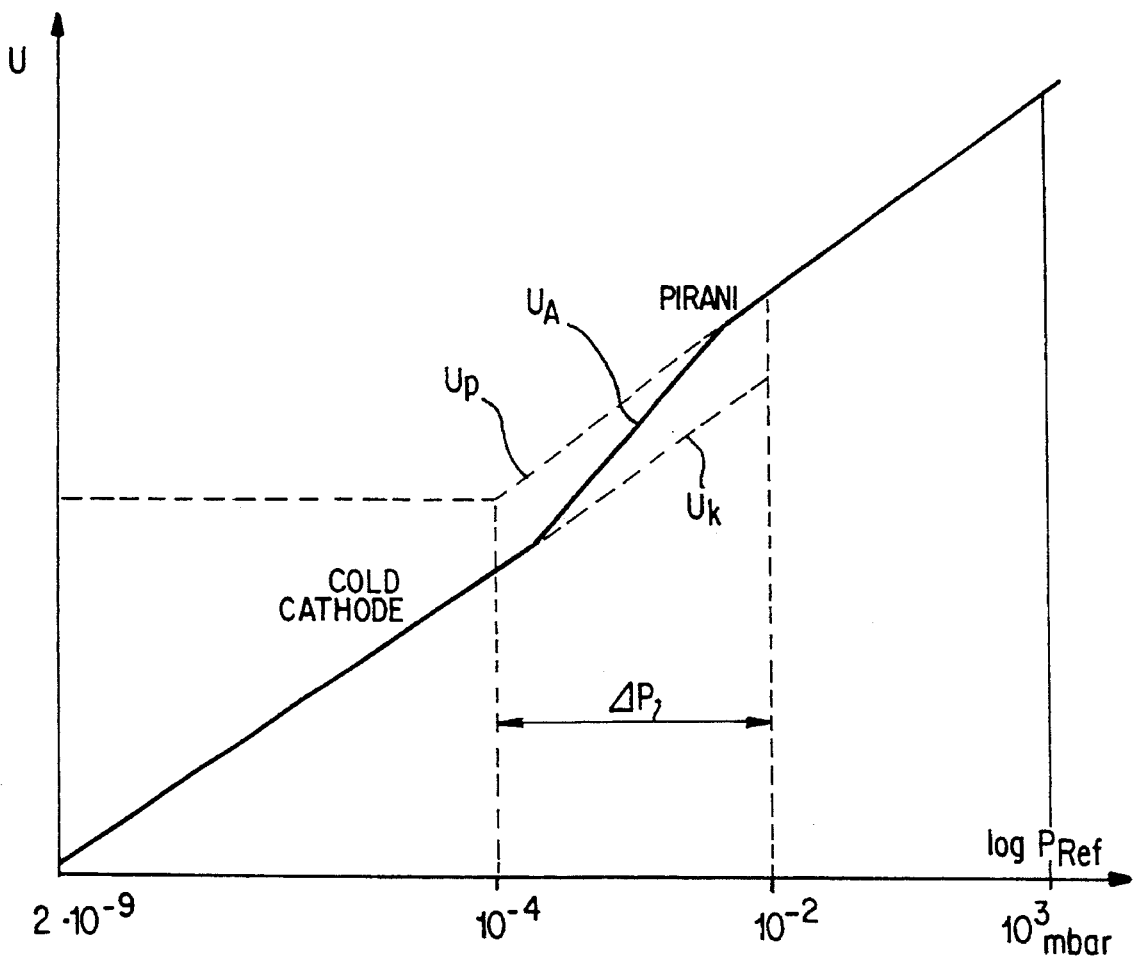
FIG. 8 is a graphical view of the measuring characteristic achieved by means of an arrangement according to FIG. 7, which measuring characteristic supplies a one-to-one measuring signal in a range which significantly exceeds the measuring range of an individual sensor.

FIG. 8 illustrates the characteristic measuring curve $U_A$ implemented by the arrangement according to FIG. 7. The quantities $U_p$ and $U_k$ are illustrated by interrupted lines. It is assumed that the curves for $U_p$ and $U_k$ differ, for example, because of a gas type deviating from the calibrating gas.

Figure 9:
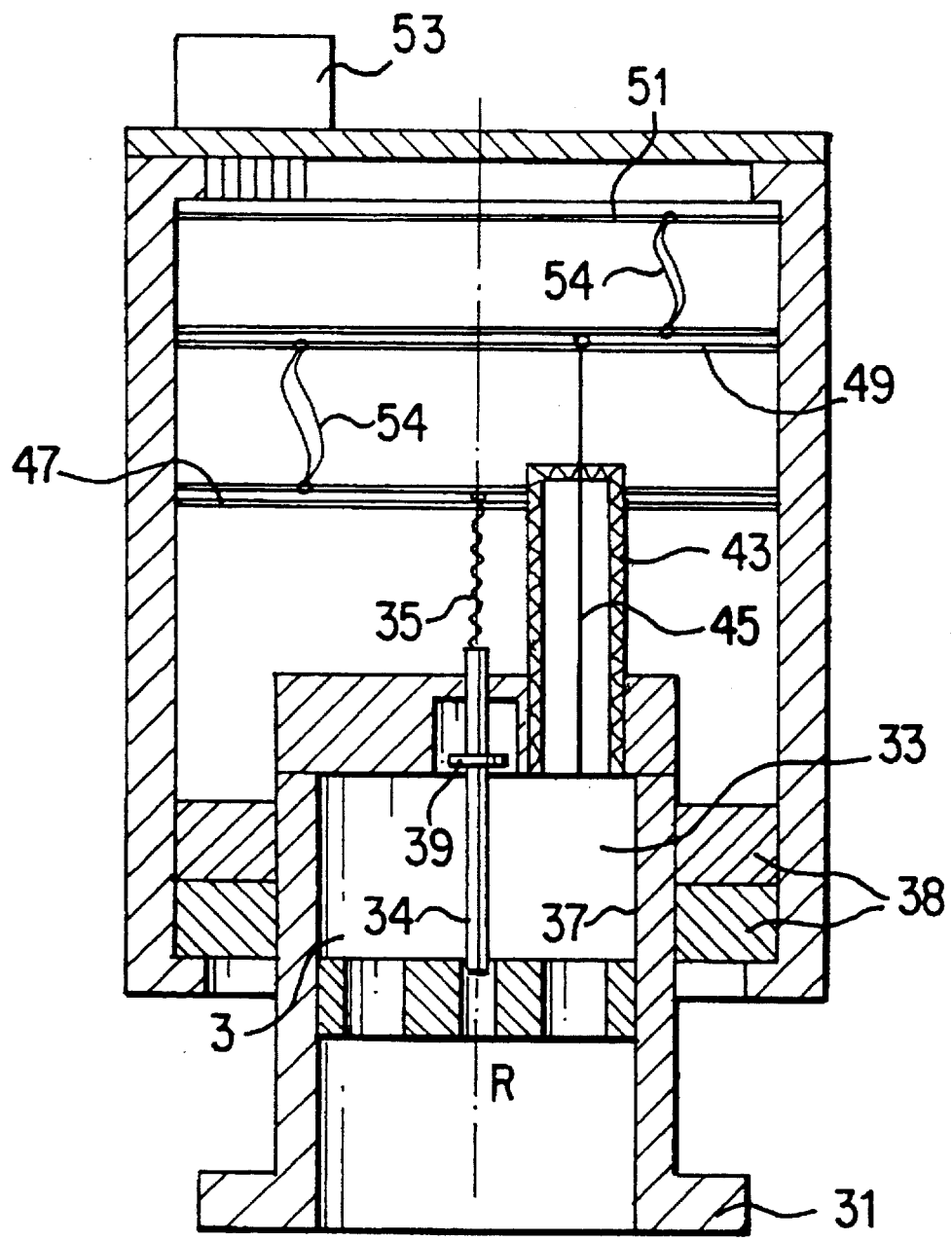
FIG. 9 is a simplified cross-sectional view of a combination measuring head according to the invention.

FIG. 9 is a schematically simplified illustration of a combination measuring head according to the invention, constructed as a flange connection for a vacuum chamber. From a flange connection 31, the measuring chamber 33, as the plasma space of the cold-cathode ionization sensor arrangement 3, is acted upon by pressure. In the measuring chamber 33, reference number 34 is the anode pin with the measuring current connection and high-voltage connection 35, and reference number 37 is the cathode wall. In the plasma space 33, the required axial magnetic field is generated by ferrite magnetic rings 38.

Furthermore, the reference number 39 indicates an arrangement mounted on the anode pin 34 which promotes the ignition of the discharge because of its sharp-edged structure.

Eccentrically with respect to the flange axis R with the anode pin 34, a Pirani measuring arrangement 43 with a heating spiral 45 is provided. The high-voltage supply 27 (FIG. 7) for the cold-cathode ionization sensor 3 is constructed on a printed circuit board 47. The measuring circuit corresponding to 21, 22, 29 of FIG. 7 is constructed on another printed circuit board 49. The weighting and output-signal determination unit is constructed on a third PC board 51.

Reference number 53 schematically indicates a connector plug for the combination according to the invention; reference 54 schematically shows connections between the provided printed circuit assemblies with the circuits mentioned as examples.

The suggested weighting technique for achieving the object of the invention may analogously also be used for combining more than two sensors in order to further increase the range for a one-to-one measuring.

Furthermore, the following sensor combinations: gas friction pressure gauge/cold-cathode ionization sensor and/or; Pirani/hot-cathode ionization sensor and/or; two diaphragm pressure gauges with different measuring ranges, may also be implemented by the above, at least in twos or by means of the above-described sensors, with one-to-one expanded measuring ranges.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for evaluating output signals of two pressure sensors, of which a first sensor is designed for an upper pressure range, and a second sensor is designed for a lower pressure range, the upper and lower pressure ranges overlapping in an intermediate range, wherein the first and second sensors have different values of output signal characteristics for the pressures in the intermediate range, the process comprising the steps of:

generating a common output signal A in a form of:

$$A = f p_p + (1-f) p_k$$

when the output signal characteristics in the intermediate range are predominantly different by an offset, wherein $p_p$ is an output signal of the first sensor, $p_k$ is an output signal of the second sensor, and f is a weighting function which changes constantly monotonically with a pressure p; and generating the output signal A in the form:

$$A = p_p^{f*} \, p_k^{(1-f)}$$

when the output signal characteristics in the intermediate range are predominantly different with respect to slope, wherein the weighting function f in a range at and below an upper limit pressure of the lower pressure range of the second sensor is selected to be substantially 0, and in a range at and above a lower limit pressure of the upper pressure range of the first sensor, is selected to be substantially 1.

2. A process according to claim 1, wherein the first sensor is a Pirani sensor and the second sensor is a cold-cathode ionization sensor, the process further comprising the step of providing the weighting function f by one of a signal which is a function of the output signal of the first sensor, and a combination of the output signal of the first sensor and a signal which depends on the common output signal A.

3. A process according to claim 2, further comprising the step of determining the weighting function according to the equation:

$$f = 1/[exp(-\lambda U) + 1],$$

wherein $\lambda = e/kT$, e = elementary charge, k = Boltzmann constant,

T = absolute temperature, $U = c + d \log p_p$, with c and d being constants.

4. A process according to claim 1, wherein the weighting function f is formed by processing the signals $p_p$, $p_k$, A in one of: 1) analog technology; 2) pulse-width-modulation deactivating of the signals depending on sensor output signals to the common output signal; and 3) digital signal processing.

5. A process according to claim 1, wherein the weighting function f is formed by:

$$f = f(p_p^a * A^b),$$

wherein a and b are constants.

6. A process according to claim 1, wherein said first and second sensors include one of the following combinations:

a gas friction pressure gauge and a cold-cathode ionization sensor;

a Pirani sensor and a hot-cathode ionization sensor; and two diaphragm pressure gauges having different measuring ranges.

7. A process according to claim 6, wherein more than two pressure sensors are used.

8. A pressure measuring arrangement, comprising:

two pressure measuring sensors, of which a first sensor is designed for an upper pressure range, and a second sensor is designed for a lower pressure range, said upper and lower pressure ranges overlapping in an intermediate range, said first and second sensors having different values of output signal characteristics for the same pressures in the intermediate range;

a weighting unit and an evaluating unit, both of which are coupled to receive output signals from the first and second sensors, said evaluating unit providing an output signal A formed at least in a first approximation by one of the following equations:

$$A = f p_p + (1-f) p_k$$

or $$A = p_p^{f*} \, p_k^{(1-f)}$$

wherein A is an output signal of the weighting unit and evaluating unit, $p_p$ is an output signal of the first sensor; $p_k$ is an output signal of the second sensor; and f is a weighting function extending constantly monotonically in the intermediate range between 0 and 1.

9. An arrangement according to claim 6, wherein the weighting function is controlled in the weighting unit and the evaluating unit by an output of one of the first and second sensors or by an output of one of the first and second sensors and an output of the weighting unit and the evaluating unit.

10. An arrangement according to claim 9, wherein the sensor is a Pirani sensor and the second sensor is a cold-cathode ionization sensor.

11. An arrangement according to claim 8, wherein the first sensor is a Pirani sensor, the second sensor is a cold-cathode ionization sensor, and the weighting unit and evaluating unit generates the output signal A according to:

$$A = p_p^{f*} \, p_k^{(1-f)}.$$

12. An arrangement according to claim 11, wherein the weighting unit and evaluating unit comprises a bipolar transistor circuit controlled by an output signal of the Pirani sensor, on which a logarithmic dependence between a base emitter voltage on an input side and a collector current on an output side is utilized for weighting.

13. An arrangement according to claim 11, wherein the weighting unit and evaluating unit has a pulse-width modulation circuit, in which, in a pulse-width-controlled manner, output signals of the two sensors are superimposed on a superimposition unit, a pulse-width repetition rate of the pulse-width modulation being controlled by an output signal of the Pirani sensor or by an output signal of the Pirani sensor and an output signal of the superimposition unit.

14. An arrangement according to claim 8, wherein the weighting unit and evaluating unit comprise a logarithmizing unit for each of the output signals of the first and second sensors.

15. An arrangement according to claim 14, wherein the weighting unit and evaluating unit comprises a bipolar transistor circuit controlled by an output signal of the Pirani sensor, on which a logarithmic dependence between a base emitter voltage on an input side and a collector current on an output side is utilized for weighting.

16. An arrangement according to claim 14, wherein the weighting unit and evaluating unit has a pulse-width modulation circuit, in which, in a pulse-width-controlled manner, output signals of the two sensors are superimposed on a superimposition unit, a pulse-width repetition rate of the pulse-width modulation being controlled by an output signal of the Pirani sensor or by an output signal of the Pirani sensor and an output signal of the superimposition unit.

17. An arrangement according to claim 8, wherein one of a transistor circuit, a pulse-width modulation unit, and a digital signal processing unit is provided for the weighting.

18. An arrangement according to claim 8, wherein said first and second sensors include one of the following combinations:

a gas friction pressure gauge and a cold-cathode ionization sensor;

a Pirani sensor and a hot-cathode ionization sensor; and two diaphragm pressure gauges having different measuring ranges.

19. An arrangement according to claim 18, wherein more than two pressure sensors are used.

20. A pressure measuring head, comprising:
- a receiving opening for a pressure medium and an electric output line for the pressure measuring head;
- a pressure measuring arrangement including two pressure measuring sensors, of which a first sensor is designed for an upper pressure range, and a second sensor is designed for a lower pressure range, said upper and lower pressure ranges overlapping in an intermediate range, said first and second sensors having different values of output signal characteristics for the same pressures in the intermediate range;
- a weighting unit and an evaluating unit, both of which are coupled to receive output signals from the first and second sensors, said evaluating unit providing an output signal A formed at least in a first approximation by one of the following equations:

$$A = f p_p + (1-f) p_k$$

or $$A = p_p^{f} * p_k^{(1-f)}$$

wherein A is an output signal of the weighting unit and evaluating unit, $p_p$ is an output signal of the first sensor; $p_k$ is an output signal of the second sensor; and f is a weighting function extending constantly monotonically in the intermediate range between 0 and 1.

21. A pressure measuring head according to claim 20, wherein one of said two sensors is a Pirani sensor; and wherein the other of said two sensors is a cold-cathode ionization sensor mechanically fixedly connected in a combined manner.

22. A pressure measuring head according to claim 20, wherein one of the first and second sensors is a cold-cathode sensor having a sharp-edged ignition electrode.

* * * * *